US006736050B1

(12) United States Patent
Monn

(10) Patent No.: US 6,736,050 B1
(45) Date of Patent: May 18, 2004

(54) PORTABLE FOOD HANDLING SYSTEM

(76) Inventor: Randolph Monn, 146 Briar Ridge Dr., Waynesboro, PA (US) 17268

( * ) Notice: Subject to any disclaimer, the term of this patent is extended or adjusted under 35 U.S.C. 154(b) by 0 days.

(21) Appl. No.: 10/314,082

(22) Filed: Dec. 6, 2002

(51) Int. Cl.[7] .......................... A47J 37/00; A47J 37/04; A23L 1/00
(52) U.S. Cl. .............................. 99/339; 99/340; 99/352; 99/417; 99/419; 126/25 R; 126/9 R
(58) Field of Search .......................... 99/339, 340, 417, 99/419–421 V, 444–450, 400, 401, 357, 482; 126/25 R, 9 R, 41 R, 21 A; 426/523, 465, 314, 345

(56) References Cited

U.S. PATENT DOCUMENTS 4,108,055 A    8/1978    Simmons
D250,317 S    11/1978    Simmons
4,757,755 A    7/1988    Sarten

*Primary Examiner*—Timothy F. Simone

(57) ABSTRACT

A portable food handling system for transporting, preparing and storing food. The portable food handling system includes a trailer assembly comprising a body portion, at least one wheel and a tongue portion. The wheel is rotatably coupled to the body portion whereby the wheel is designed for rolling across a support surface to facilitate transporting of the body portion across the support surface. The tongue portion is coupled to the body portion. The tongue portion is designed for being selectively coupled to a vehicle to facilitate transporting of the body portion across the support surface. At least one food handling assembly is selectively coupled to the body portion of the trailer assembly. The food handling assembly is designed for handling food received by the food handling assembly.

19 Claims, 6 Drawing Sheets

PORTABLE FOOD HANDLING SYSTEM

BACKGROUND OF THE INVENTION

1. Field of the Invention

The present invention relates to mobile cooking devices and more particularly pertains to a new portable food handling system for transporting, preparing and storing food.

2. Description of the Prior Art

The use of mobile cooking devices is known in the prior art. U.S. Pat. No. 4,108,055 describes a system for transporting a cooking apparatus to a location to allow for the preparation of the food. Another type of mobile cooking devices is U.S. Pat. No. 4,757,755 having a cooking apparatus that can be coupled to a vehicle to be transported to a desired location. U.S. Pat. No. Des. 250,317 shows a mobile broiler rotisserie.

While these devices fulfill their respective, particular objectives and requirements, the need remains for a system that has certain improved features that allow for interchangeability to meet the desired need of the user.

SUMMARY OF THE INVENTION

The present invention meets the needs presented above by providing multiple types of food handling assemblies that are selectively removable from the trailer assembly to accommodate the needs of the user.

Still yet another object of the present invention is to provide a new portable food handling system that allows the user to transport either a grill assembly or a steamer assembly to prepare food.

Even still another object of the present invention is to provide a new portable food handling system that allows a user to transport a storage assembly to store food.

To this end, the present invention generally comprises a trailer assembly comprising a body portion, at least one wheel and a tongue portion. The wheel is rotatably coupled to the body portion whereby the wheel is designed for rolling across a support surface to facilitate transporting of the body portion across the support surface. The tongue portion is coupled to the body portion. The tongue portion is designed for being selectively coupled to a vehicle to facilitate transporting of the body portion across the support surface. At least one food handling assembly is selectively coupled to the body portion of the trailer assembly. The food handling assembly is designed for handling food received by the food handling assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
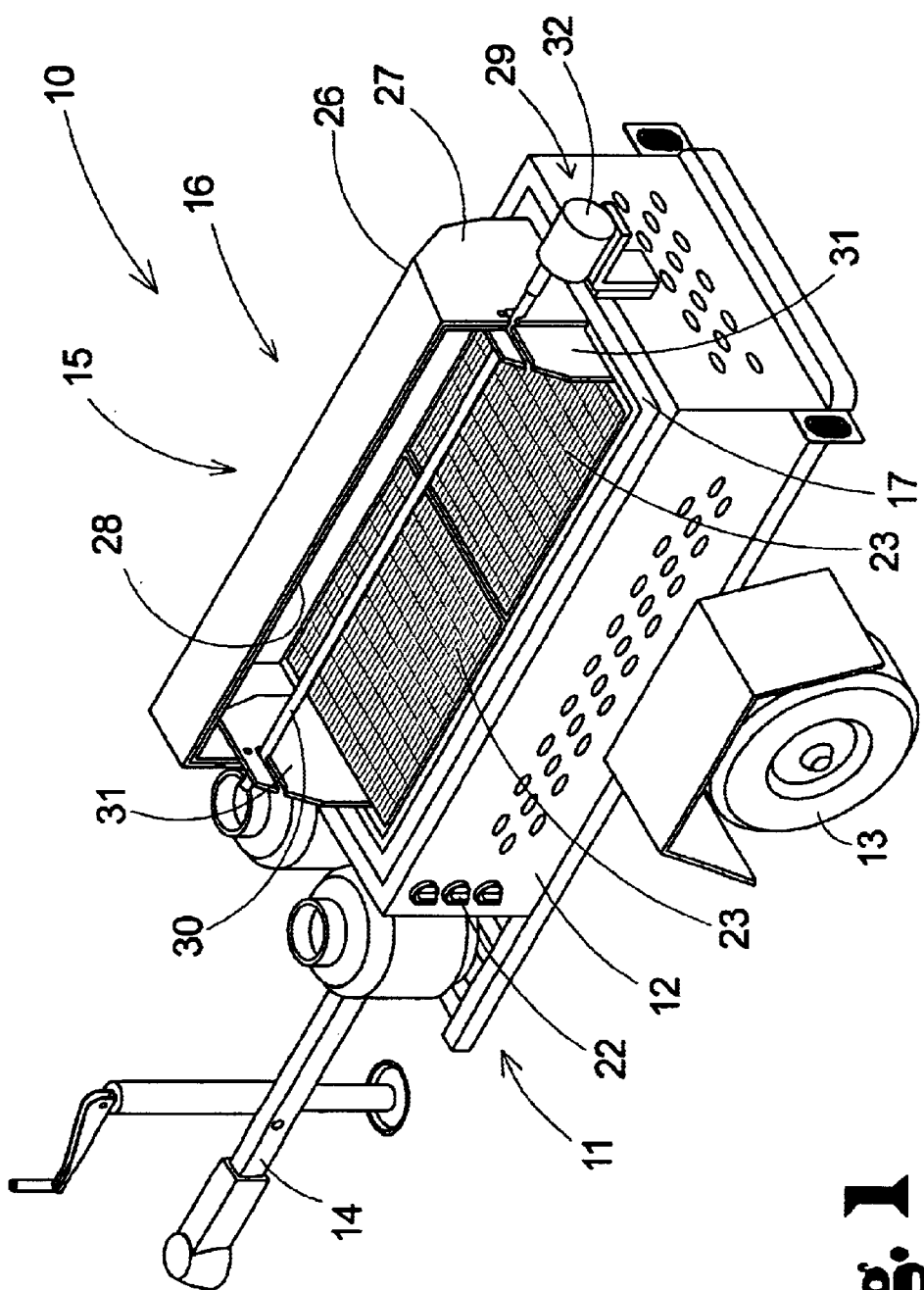
FIG. 1 is a perspective view of a new portable food handling system according to the present invention.

With reference now to the drawings, and in particular to FIGS. 1 through 6 thereof, a new portable food handling system embodying the principles and concepts of the present invention and generally designated by the reference numeral 10 will be described.

As best illustrated in FIGS. 1 through 6, the portable food handling system 10 generally comprises a trailer assembly 11 comprising a body portion 12, at least one wheel 13 and a tongue portion 14. The wheel 13 is rotatably coupled to the body portion 12 whereby the wheel 13 is designed for rolling across a support surface to facilitate transporting of the body portion 12 across the support surface. The tongue portion 14 is coupled to the body portion 12. The tongue portion 14 is designed for being selectively coupled to a vehicle to facilitate transporting of the body portion 12 across the support surface.

At least one food handling assembly 15 is selectively inserted into the body portion 12 of the trailer assembly 11. The food handling assembly 15 is designed for handling food received by the food handling assembly 15.

The food handling assembly 15 comprises a grill assembly 16. The grill assembly 16 is selectively coupled to the trailer assembly 11. The grill assembly is designed for receiving food that is to be cooked.

The grill assembly 16 comprises a tub portion 17. The tub portion 17 is selectively positioned in the body portion 12 of the trailer assembly 11. The tub portion 17 comprises a perimeter wall 18 defining an interior space 19 of the tub portion 17 whereby a heat supply portion 20 of the grill assembly 16 is positioned in the interior space 19 of the tub portion 17. The tub portion 17 is designed for receiving the food to be cooked by the heat supply portion 20 being positioned in the tub portion 17 of the grill assembly 16.

The heat supply portion 20 comprises at least one burner member 21. The burner member 21 is positioned in the interior space 19 of the tub portion 17 of the grill assembly 16. The burner member 21 is designed for being operationally coupled to a gas supply whereby the burner member 21 emits a combustible gas to be burned to produce heat for cooking the food when the gas supply supplies the combustible gas to the burner member 21.

The heat supply portion 20 comprises a control member 22. The control member 22 is operationally coupled to the burner member 21 whereby the control member 22 is designed for being operationally coupled between the burner member 21 and the gas supply. The control member 22 is designed for controlling the amount of combustible gas is supplied to the burner member 21 from the gas supply.

The grill assembly 16 comprises at least one grill member 23. The grill member 23 is selectively positioned in the interior space 19 of the tub portion 17 of the grill assembly 16. The grill member 23 is designed for supporting the food above the heat supply portion 20 to allow the food to be cooked by the heat supplied by the heat supply portion 20 when the tub portion 17 of the grill assembly 16 receives the food.

The grill assembly 16 comprises a radiant heat member 24. The radiant heat member 24 is selectively positioned in the interior space 19 of the tub portion 17 of the grill assembly 16. The radiant heat member 24 is heated by the heat supply portion 20 whereby the radiant heat member 24 is designed for radiating heat evenly across the grill member 23 to evenly cook food placed on the grill member 23.

The grill assembly 16 comprises grease pan member 25. The grease pan member 25 is selectively positioned in the interior space 19 of the tub portion 17 of the grill assembly 16. The grease pan member 25 is designed for collecting grease dripping from the food on the grill member 23 to be disposed at a later time.

The grill assembly 16 comprises a cover portion 26. The cover portion 26 is coupled to the tub portion 17 of the grill assembly 16. The cover portion 26 selectively covering the interior space 19 of the tub portion 17 whereby the cover portion 26 reflects heat emitted by the heat supply portion 20 back into the interior space 19 of the tub portion 17 for facilitating cooking of the food received by the tub portion 17.

The cover portion 26 of the grill assembly 16 comprises a back member 27 and a front member 28. The back member 27 is coupled to the tub portion 17 of the grill assembly 16. The front member 28 is pivotally coupled to the back member 27 whereby the front member 28 is pivoted between an open position and a closed position. The open position of the front member 28 is defined by the front member 28 is positioned concentric to the back member 27 for permitting access to the interior space 19 of the tub portion 17. The closed position of the front member 28 is defied by the front member 28 is extended from the back member 27 whereby the front member 28 and the back member 27 inhibit access to the interior space 19 of the tub portion 17.

A rotisserie assembly 29 is coupled to the cover portion 26 of the grill assembly 16. The rotisserie assembly 29 is designed for receiving food and rotating the food over the heat supply portion 20 in the tub portion 17 for cooking the food.

The rotisserie assembly 29 comprises a rotating portion 30 and a pair of bracket portions 31. Each of the bracket portions 31 is oppositely coupled to the tub portion 17. The rotating portion 30 is rotatably coupled to the bracket portions 31 whereby the rotating portion 30 is suspended over the interior space 19 of the tub portion 17. The rotating portion 30 is designed for receiving the food whereby the food is suspended over the interior space 19 of the tub portion 17 and rotated when the rotating portion 30 is rotated with respect to the bracket portions 31.

A motor assembly 32 is coupled to the trailer assembly 11. The motor assembly 32 is operationally coupled to the rotating portion 30 of the rotisserie assembly 29 whereby the motor assembly 32 is for selectively rotating the rotating portion 30 with respect to the brackets portions.

Figure 4:
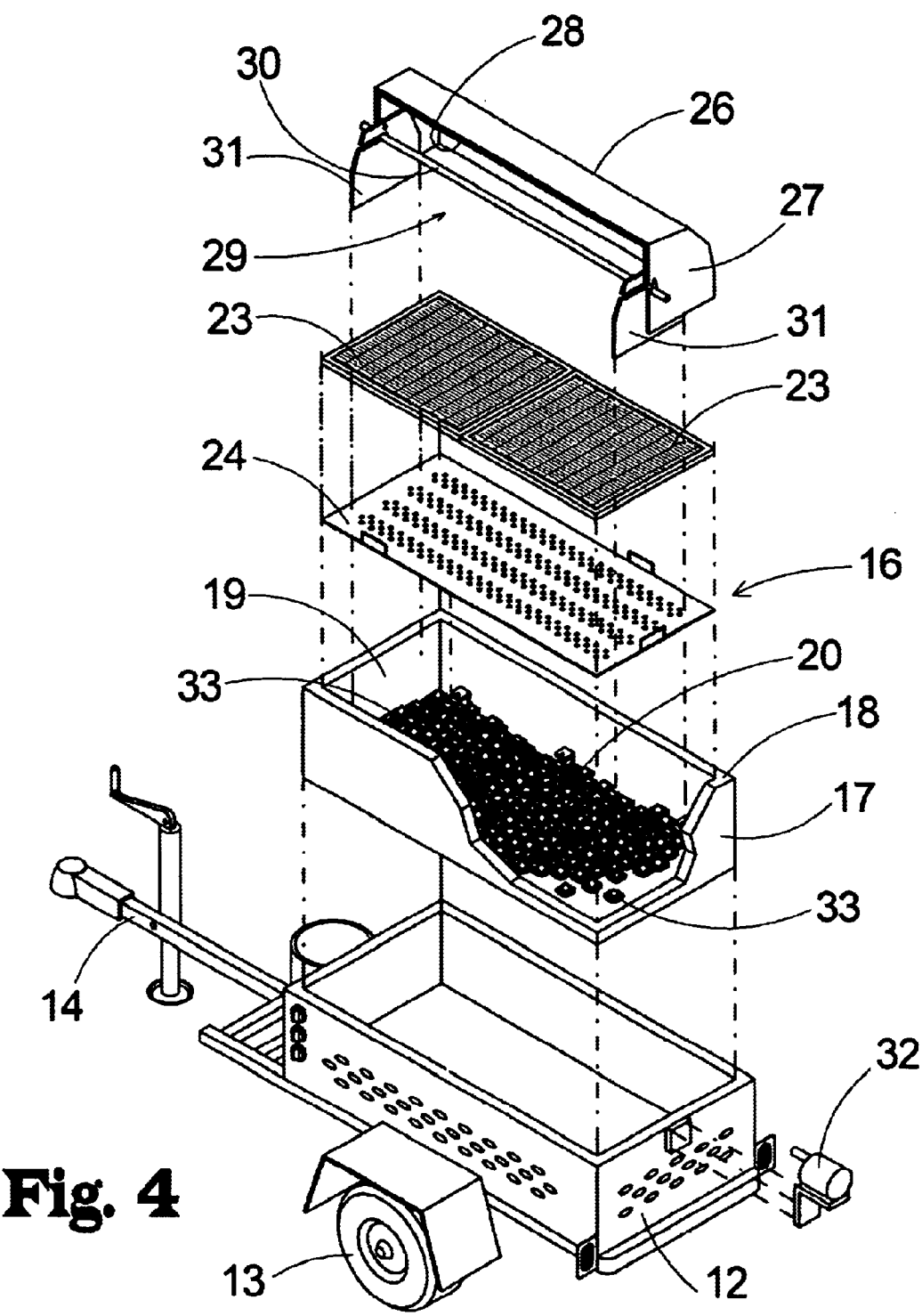
FIG. 4 is an exploded perspective view of an embodiment of the present invention.

In an embodiment, as shown in FIG. 4, the heat supply portion 20 comprises a plurality of charcoal briquettes 33. Each of the charcoal briquettes 33 is designed for smoldering whereby the charcoal briquettes 33 produce heat for cooking the food received by the grill assembly 16.

Figure 2:
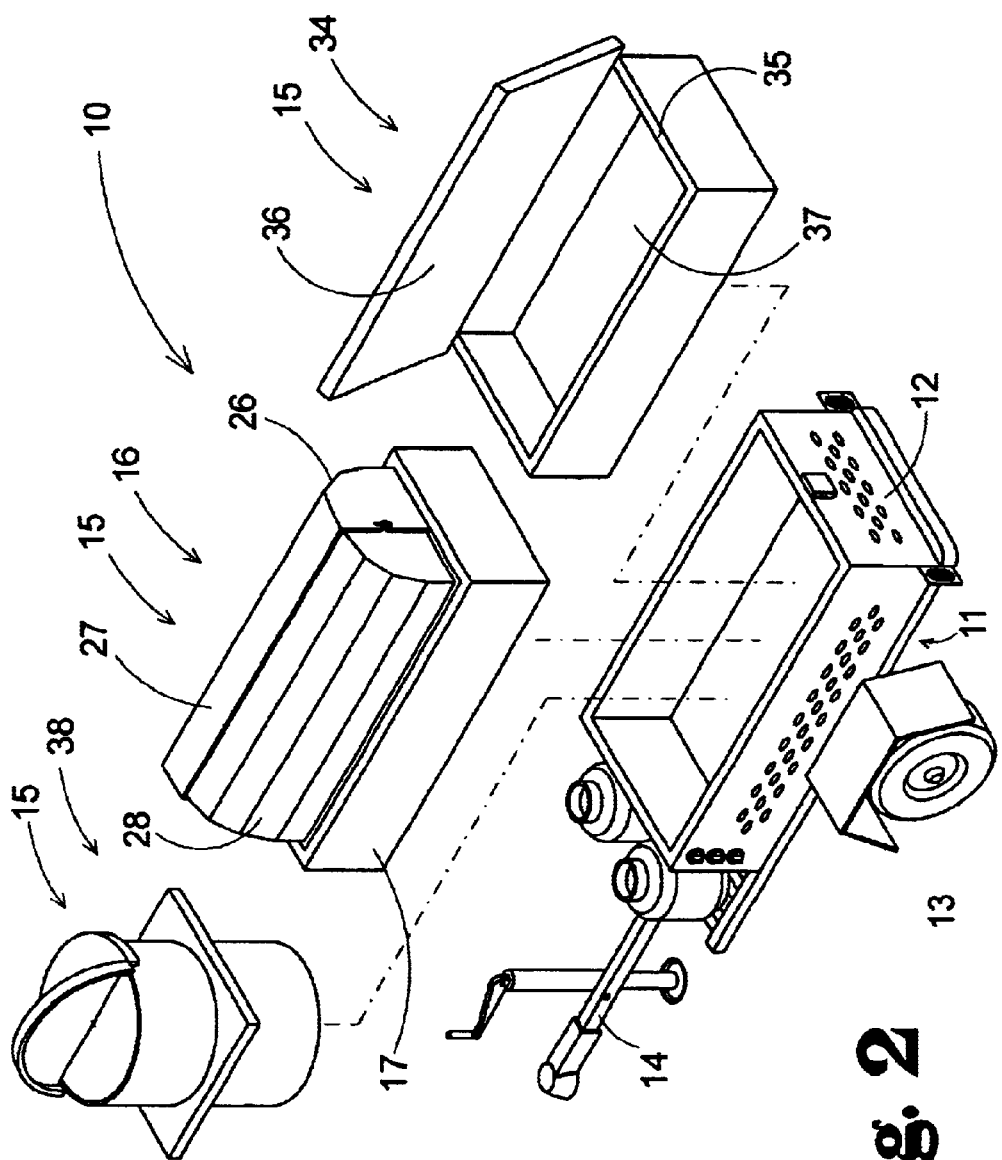
FIG. 2 is an exploded perspective view of the present invention.
Figure 3:
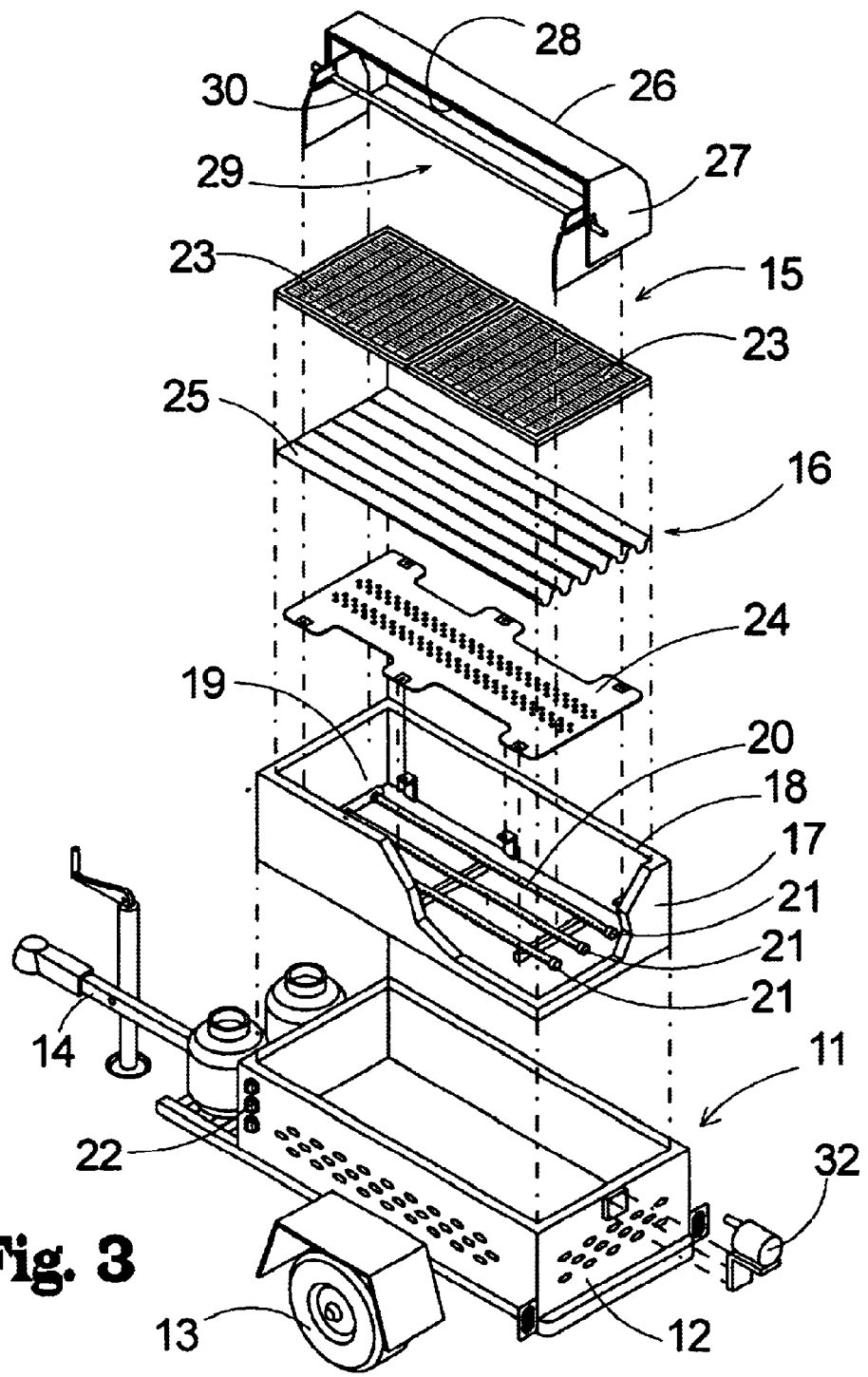
FIG. 3 is an exploded perspective view of the present invention.

In an embodiment, as shown in FIG. 2, the food handling assembly 15 comprises a storage assembly 34. The storage assembly 34 is selectively inserted into the body portion 12 of the trailer assembly 11. The storage assembly 34 is designed for receiving food whereby the storage assembly 34 keeps food cold when food is received by the storage assembly 34. The storage assembly 34 comprises a peripheral wall 35 and a lid member 36. The peripheral wall 35 of the storage assembly 34 defines a storage space 37 of the storage assembly 34. The lid member 36 is hingably coupled to the peripheral wall 35 whereby the lid member 36 selectively closes the storage space 37 of the storage assembly 34. The peripheral wall 35 and the lid member 36 of the storage assembly 34 is designed for inhibiting thermal transfer from the food to the environment. The food handling assembly 15 comprises a steamer assembly 38. The steamer assembly 38 is selectively inserted into the body portion 12 of the trailer assembly 11. The steamer assembly 38 is designed for steaming food received by the steamer assembly 38.

Figure 5:
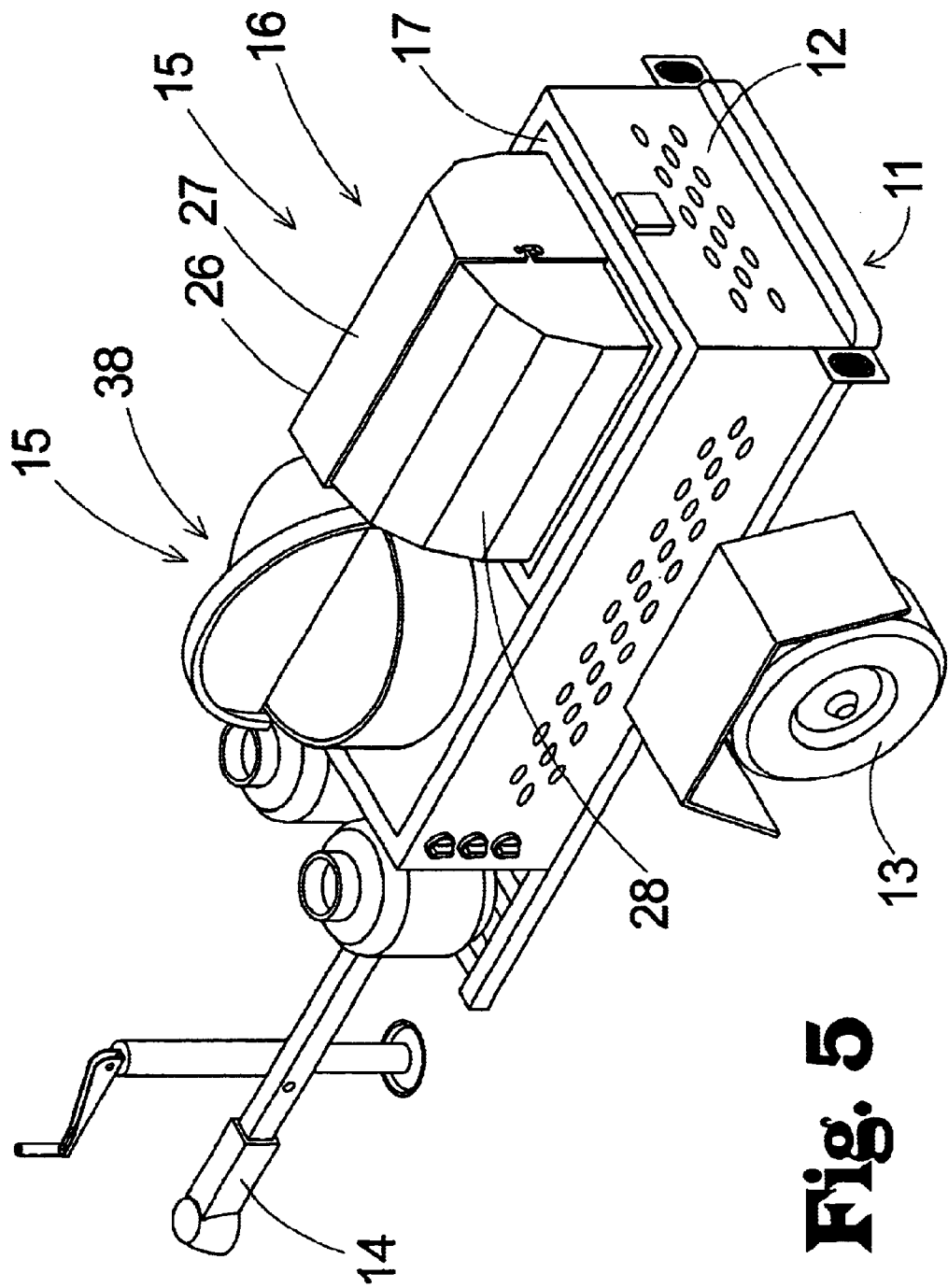
FIG. 5 is a perspective view of an embodiment of the present invention.
Figure 6:
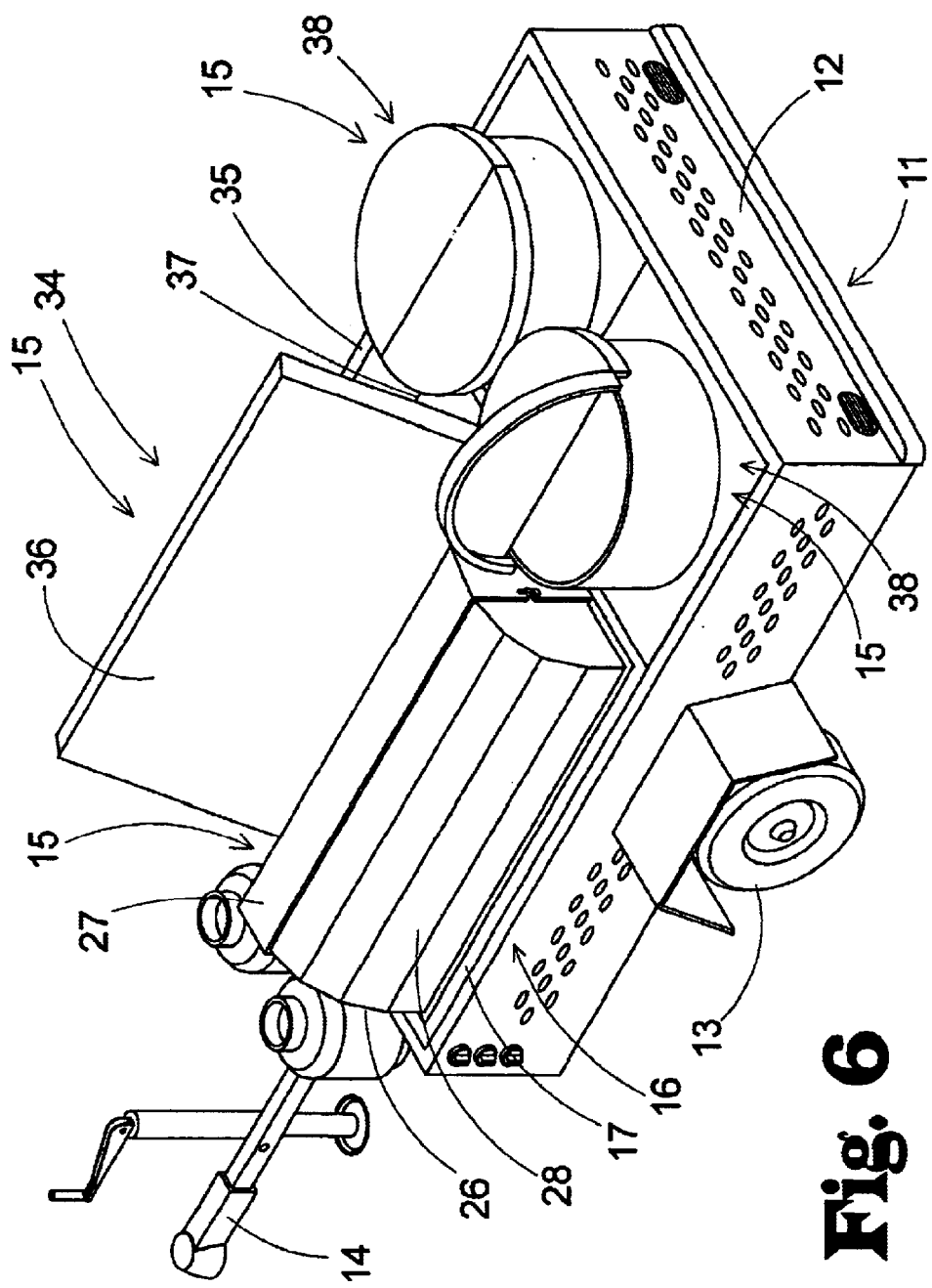
FIG. 6 is a perspective view of an embodiment of the present invention.

In an embodiment, as shown in FIGS. 5 and 6, a combination of the grill assembly 16, the storage assembly 34 and the steamer assembly 38 or multiples of each may be combined and inserted into the body portion 12 of the trailer assembly 11 to form a versatile and portable food handling system In use, the user couples the tongue portion 14 of the trailer assembly 11 to the vehicle. The user then chooses from the grill assembly 16, the storage assembly 34 or the steamer assembly 38 and inserts the chosen food handling assembly 15 is inserted into the body portion 12 of the trailer assembly 11 and transported to the desired location. The chosen food handling assembly 15 is then used to either prepare food or store food as needed by the user.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable food handling system comprising:

a trailer assembly comprising a body portion, at least one wheel and a tongue portion, said wheel being rotatably coupled to said body portion such that said wheel is adapted for rolling across a support surface to facilitate transporting of said body portion across the support surface, said tongue portion being coupled to said body portion, said tongue portion being adapted for being selectively coupled to a vehicle to facilitate transporting of said body portion across the support surface;

at least one food handling assembly being selectively inserted into said body portion of said trailer assembly, said food handling assembly being adapted for handling food received by said food handling assembly;

said food handling assembly comprising a grill assembly, said grill assembly being selectively coupled to said trailer assembly, said grill, assembly being adapted for receiving food that is to be cooked; and said grill assembly comprising a tub portion, said tub portion being selectively positioned in said body portion of said trailer assembly, said tub portion comprising a perimeter wall defining an interior space of said tub portion such that a heat supply portion of said grill assembly is positioned in said interior space of said tub portion, said tub portion being adapted for receiving the food to be cooked by said heat supply portion is positioned in said tub portion of said grill assembly.

2. The portable food handling system as set forth in claim 1, further comprising:

said heat supply portion comprising at least one burner member, said burner member being positioned in said interior space of said tub portion of said grill assembly; said burner member being adapted for being operationally coupled to a gas supply such that said burner member emits a combustible gas to be burned to produce heat for cooking the food when the gas supply supplies the combustible gas to said burner member.

3. The portable food handling system as set forth in claim 2, further comprising:

said heat supply portion comprising a control member, said control member being operationally coupled to said burner member such that said control member is adapted for being operationally coupled between said burner member and the gas supply, said control member being adapted for controlling the amount of combustible gas being supplied to said burner member from the gas supply.

4. The portable food handling system as set forth in claim 1, further comprising:

said heat supply portion comprising a plurality of charcoal briquettes, each of said charcoal briquettes being adapted for smoldering such that said charcoal briquettes produce heat for cooking the food received by said grill assembly.

5. The portable food handling system as set forth in claim 1, further comprising:

said grill assembly comprising at least one grill member, said grill member being selectively positioned in said interior space of said tub portion of said grill assembly, said grill member being adapted for supporting the food above said heat supply portion to allow the food to be cooked by the heat supplied by said beat supply portion when said tub portion of said grill assembly receives the food.

6. The portable food handling system as set forth in claim 5, further comprising:

said grill assembly comprising a radiant heat member, said radiant heat member being selectively positioned in said interior space of said tub portion of said grill assembly, said radiant heat member being heated by said supply portion such that said radiant heat member is adapted for radiating heat evenly across said grill member to evenly cook food placed on said grill member.

7. The portable food handling system as set forth in claim 5, further comprising:

said grill assembly comprising grease pan member, said grease pan member being selectively positioned in said interior space of said tub portion of said grill assembly, said grease pan member being adapted for collecting grease dripping from the food on said grill member to be disposed at a later time.

8. The portable food handling system as set forth in claim 1, further comprising:

said grill assembly comprising a cover portion, said cover portion being coupled to said tub portion of said grill assembly, said cover portion selectively covering said interior space of said tub portion such that said cover portion reflects heat emitted by said heat supply portion back into said interior space of said tub portion for facilitating cooking of the food received by said tub portion.

9. The portable food handling system as set forth in claim 8, further comprising:

said cover portion of said grill assembly comprising a back member and a front member, said back member being coupled to said tub portion of said grill assembly, said front member being pivotally coupled to said back member such that said front member is pivoted between an open position and a closed position, said open position of said front member being defined by said front member being positioned concentric to said back member for permitting access to said interior space of said tub portion, said closed position of said front member being defied by said front member being extended from said back member such that said front member and said back member inhibit access to said interior space of said tub portion.

10. The portable food handling system as set forth in claim 8, further comprising:

a rotisserie assembly being coupled to said cover portion of said grill assembly, said rotisserie assembly being adapted for receiving food and rotating the food over said heat supply portion in said tub portion for cooking the food.

11. The portable food handling system as set forth in claim 10, further comprising:

said rotisserie assembly comprising a rotating portion and a pair of bracket portions, each of said bracket portions being oppositely coupled to said tub portion, said rotating portion being rotatably coupled to said bracket portions such that said rotating portion is suspended over said interior space of said tub portion, said rotating portion being adapted for receiving the food such that the food is suspended over said interior space of said tub portion and rotated when said rotating portion is rotated with respect to said bracket portions.

12. The portable food handling system as set forth in claim 11, further comprising:

a motor assembly being coupled to said trailer assembly, said motor assembly being operationally coupled to said rotating portion of said rotisserie assembly such that said motor assembly is for selectively rotating said rotating portion with respect to said brackets portions.

13. The portable food handling system as set forth in claim 1, further comprising:

said food handling assembly comprising a storage assembly, said storage assembly being selectively inserted into said body portion of said trailer assembly, said storage assembly being adapted for receiving food such that said storage assembly keeps food cold when food is received by said storage assembly.

14. The portable food handling system as set forth in claim 13, further comprising:

said storage assembly comprising a peripheral wall and a lid member, said peripheral wall of said storage assembly defining a storage space of said storage assembly, said lid member being hingably coupled to said peripheral wall such that said lid member selectively closes said storage space of said storage assembly, said peripheral wall and said lid member of said storage assembly being adapted for inhibiting thermal transfer from the food to the environment.

15. The portable food handling system as set forth in claim 1, further comprising:

said food handling assembly comprising a steamer assembly, said steamer assembly being selectively inserted into said body portion of said trailer assembly, said steamer assembly being adapted for steaming food received by said steamer assembly.

16. The portable food handling system as set forth in claim 1, further comprising:

said heat supply portion comprising at least one burner member, said burner member being positioned in said interior space of said tub portion of said grill assembly, said burner member being adapted for being operationally coupled to a gas supply such that said burner member emits a combustible gas to be burned to produce heat for cooking the food when the gas supply supplies the combustible gas to said burner member;

said heat supply portion comprising a control member, said control member being operationally coupled to said burner member such that said control member is adapted for being operationally coupled between said burner member and the gas supply, said control member being adapted for controlling the amount of combustible gas being supplied to said burner member from the gas supply;

said grill assembly comprising at least one grill member, said grill member being selectively positioned in said interior space of said tub portion of said grill assembly, said grill member being adapted for supporting the food above said heat supply portion to allow the food to be cooked by the heat supplied by said heat supply portion when said tub portion of said grill assembly receives the food;

said grill assembly comprising a radiant heat member, said radiant heat member being selectively positioned in said interior space of said tub portion of said grill assembly, said radiant heat member being heated by said supply portion such that said radiant heat member is adapted for radiating heat evenly across said grill member to evenly cook food placed on said grill member;

said grill assembly comprising grease pan member, said grease pan member being selectively positioned in said interior space of said tub portion of said grill assembly, said grease pan member being adapted for collecting grease dripping from the food on said grill member to be disposed at a later time;

said grill assembly comprising a cover portion, said cover portion being coupled to said tub portion of said grill assembly, said cover portion selectively covering said interior space of said tub portion such that said cover portion reflects heat emitted by said heat supply portion back into said interior space of said tub portion for facilitating cooking of the food received by said tub portion;

said cover portion of said grill assembly comprising a back member and a front member, said back member being coupled to said tub portion of said grill assembly, said front member being pivotally coupled to said back member such that said front member is pivoted between an open position and a closed position, said open position of said front member being defined by said front member being positioned concentric to said back member for permitting access to said interior space of said tub portion, said closed position of said front member being defied by said front member being extended from said back member such that said front member and said back member inhibit access to said interior space of said tub portion;

a rotisserie assembly being coupled to said cover portion of said grill assembly, said rotisserie assembly being adapted for receiving food and rotating the food over said heat supply portion in said tub portion for cooking the food;

said rotisserie assembly comprising a rotating portion and a pair of bracket portions, each of said bracket portions being oppositely coupled to said tub portion, said rotating portion being rotatably coupled to said bracket portions such that said rotating portion is suspended over said interior space of said tub portion, said rotating portion being adapted for receiving the food such that the food is suspended over said interior space of said tub portion and rotated when said rotating portion is rotated with respect to said bracket portions; and a motor assembly being coupled to said trailer assembly, said motor assembly being operationally coupled to said rotating portion of said rotisserie assembly such that said motor assembly is for selectively rotating said rotating portion with respect to said brackets portions.

17. A portable food handling system comprising:

a trailer assembly comprising a body portion, at least one wheel and a tongue portion, said wheel being rotatably coupled to said body portion such that said wheel is adapted for rolling across a support surface to facilitate transporting of said body portion across the support surface, said tongue portion being coupled to said body portion, said tongue portion being adapted for being selectively coupled to a vehicle to facilitate transporting of said body portion across the support surface;

at least one food handling assembly being selectively inserted into said body portion of said trailer assembly, said food handling assembly being adapted for handling food received by said food handling assembly; and said food handling assembly comprising a storage assembly, said storage assembly being selectively inserted into said body portion of said trailer assembly, said storage assembly being adapted for receiving food such that said storage assembly keeps food cold when fond is received by said storage assembly.

18. The portable food handling system as set forth in claim 17, further comprising:

said storage assembly comprising a peripheral wall and a lid member, said peripheral wall of said storage assembly defining a storage space of said storage assembly, said lid member being hingably coupled to said peripheral wall such that said lid member selectively closes said storage space of said storage assembly, said peripheral wall and said lid member of said storage assembly being adapted for inhibiting thermal transfer from the food to the environment.

19. A portable food handling system comprising:

a trailer assembly comprising a body portion, at least one wheel and a tongue portion, said wheel being rotatably coupled to said body portion such that said wheel is adapted for rolling across a support surface to facilitate transporting of said body portion across the support surface, said tongue portion being coupled to said body portion, said tongue portion being adapted for being selectively coupled to a vehicle to facilitate transporting of said body portion across the support surface;

at least one food handling assembly being selectively inserted into said body portion of said trailer assembly, said food handling assembly being adapted for handling food received by said food handling assembly; and said food handling assembly comprising a steamer assembly, said steamer assembly being selectively inserted into said body portion of said trailer assembly, said steamer assembly being adapted for steaming food received by said steamer assembly.

* * * * *